(12) United States Patent
Nazarian et al.

(10) Patent No.: US 7,707,137 B2
(45) Date of Patent: Apr. 27, 2010

(54) METHOD AND APPARATUS FOR BROWSING MEDIA CONTENT BASED ON USER AFFINITY

(75) Inventors: David S. Nazarian, San Francisco, CA (US); Brenda K. Laurel, Los Gatos, CA (US); Kimberly A. Perzel, Bedford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 291 days.

(21) Appl. No.: 11/482,627

(22) Filed: Jul. 6, 2006

(65) Prior Publication Data

US 2007/0074252 A1 Mar. 29, 2007

Related U.S. Application Data

(60) Provisional application No. 60/722,696, filed on Sep. 29, 2005.

(51) Int. Cl.
*G06F 17/30* (2006.01)
(52) U.S. Cl. .............................. 707/1; 725/34; 725/35; 725/45; 725/46
(58) Field of Classification Search ..................... 701/1, 701/100; 725/34, 35, 45, 46
See application file for complete search history.

(56) References Cited

U.S. PATENT DOCUMENTS

| RE36,207 E | * | 5/1999 | Zimmermann et al. | ........... 707/E17.009 |
|---|---|---|---|---|
| 7,120,619 B2 | * | 10/2006 | Drucker et al. | ................. 706/45 |
| 2002/0184195 A1 | * | 12/2002 | Qian | .............................. 707/3 |
| 2006/0195515 A1 | * | 8/2006 | Beaupre et al. | ............. 709/203 |

* cited by examiner

*Primary Examiner*—Mohammad Ali
*Assistant Examiner*—Thuy (Tiffany) Bui
(74) *Attorney, Agent, or Firm*—Park, Vaughan & Fleming LLP

(57) ABSTRACT

One embodiment of the present invention provides a system for browsing a collection of metadata to locate media content associated with an item of metadata. The system operates by receiving a selection of an affinity from a user, wherein the affinity specifies a baseline preference of the user. Next, the system determines a value for each item of metadata in the collection of metadata that specifies how well each item of metadata fits the affinity. Finally, the system arranges the collection of metadata in a view, so that items of metadata with similar values are arranged in close proximity within the view, and so that items of metadata with dissimilar values are not arranged in close proximity within the view.

15 Claims, 19 Drawing Sheets
(15 of 19 Drawing Sheet(s) Filed in Color)

BROWSING ENVIRONMENT 100

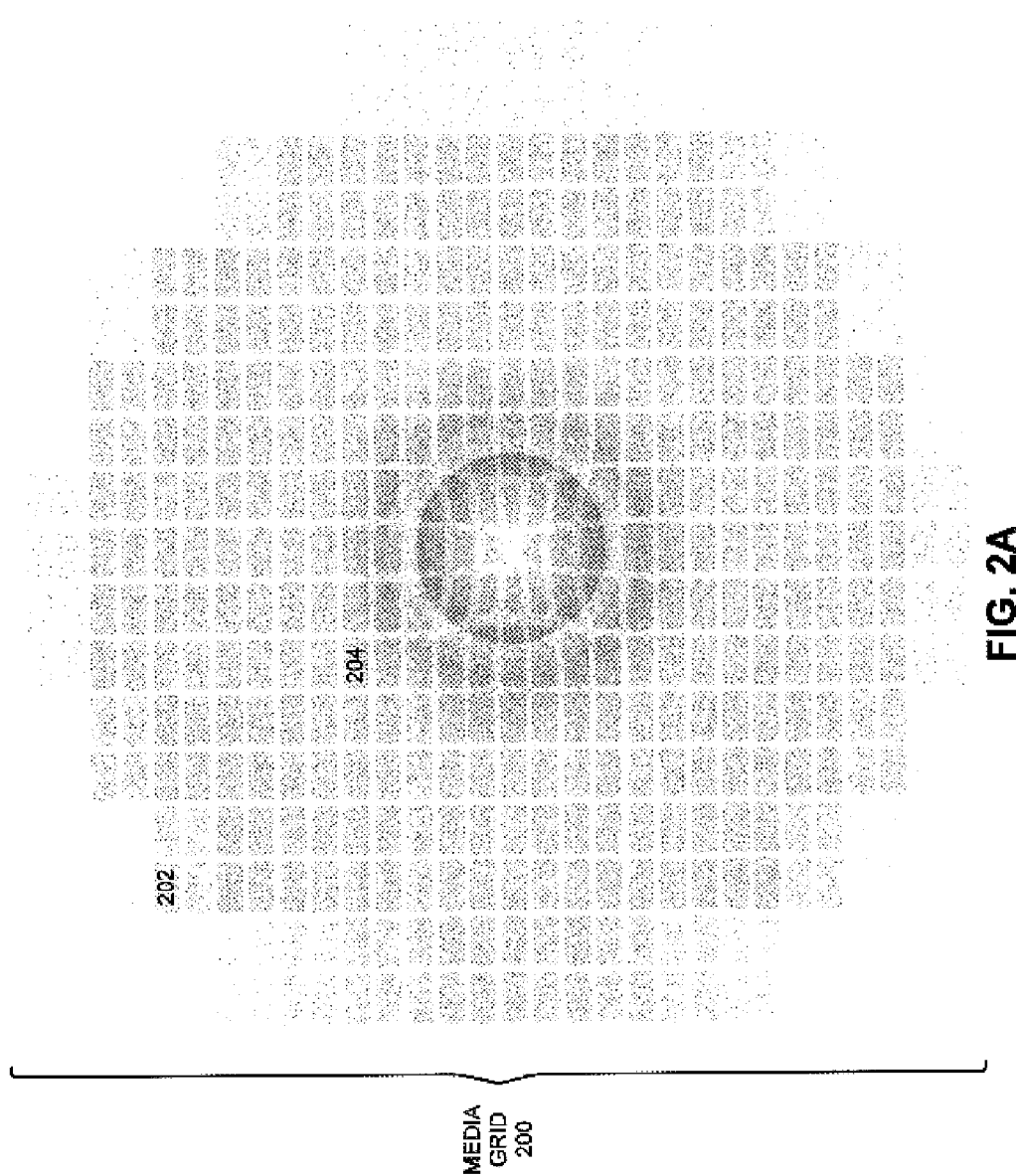

AEGIS CONSIDERATIONS:
- lens properties should remain constant yet contextually available
- lens relationship to grid changes depending on context (eg. unstructured
     vs. saved search)

FIG. 4A

LENS OBJECT > FIGS. 2B-2D
The lens is an actor as a device and is made up of several parts. Fig. 2E
    illustrates the inner workings of the lens.
- outer ring
       - directional arrows - indicates where to move the lens to encounter
             the result that appears.
       - directional label indicators
- inner ring (chassis/armiture)
- 'affinity gels'
       - manipulation (affordances) 'grab-edges'
       -  gel placement * - do they snap into place, get pulled there,
             etc.
       - text label
       - size relationship
- lens 'material' / area (glass. goo...) has inside of it
       - image preview
       - text labeling
       - results emitting (panels) - when you do the Mix, (FIG. 2G) results
             emit
- results panels
       - label
             - media title
             - search hit score
- selection panel (FIG. J)
       - label
             - media title
             - search hit score
             - action buttons
                   - view
                   - queue
                   - recommend
                   - review (FIG. K)
                         - shaded panel (to occlude background noise)
                         - media details
                               - eg. director
                               - eg. cinematographer
                               - eg. production design
                               - eg. m/f leads

FIG. 4B

```
GRID OBJECT  (note: occurs during 'histogram' saved search results context) >
- color
       - by grouping type
- contrast / brightness
       - noise reduction + focusing
- labeling
       - on-grid panel
              - search date
       - floating (group associated)
              - group / type description
```

FIG. 4C

```
TOOL BAR OBJECT > (FIG. 4D)
- PART 1 (RIGHT HAND PIECE)
       - local data (time/ date)
       - remote data (server info)
- PART 2 (LEFT HAND PART)
       - gel palette
              - selection tray
              - 'more'...scroll  buttons
       - gel selection description tab - Targeted rollover that describes
         what you are selecting.
```

FIG. 4D

EXPERIENCE OBJECTS:
Experience objects are objects that describe the use and comprehension of parts of the device objects.
- grid
- grid effects
    - color coding
        - histogram style
    - transitional movements
    - transparency
- lens effects
    - size changes
    - overlap (w/ the grid)
    - magnification
    - maximum and minimum size constraints are needed
- toolbar effects
    - gel selection
    - gel placement
- affinity gel effects
    - re-sizing
    - overlap (w/ other gels)
    - Note: Whether one gel is on top of another has no additional meaning.

FIG. 4E

METHOD AND APPARATUS FOR BROWSING MEDIA CONTENT BASED ON USER AFFINITY

RELATED APPLICATIONS

This application hereby claims priority under 35 U.S.C. §119(e) to U.S. Provisional Application Ser. No. 60/722,696, filed on 29 Sep. 2005, the contents of which are herein incorporated by reference.

BACKGROUND

1. Field of the Invention

The present invention relates to media content. More specifically, the present invention relates to a method and an apparatus for browsing media content based on user affinity.

2. Related Art

Traditional browsers or search methodologies for browsing media content typically present the media in a linear grid format. The resulting view of the media content resembles the image of a "brick wall". For example, cable or satellite providers typically allow consumers to browse an on-screen programming guide. These guides typically use the "brick wall" format, with channels listed down the left side and times listed across the bottom. This format works well for a relatively small amount of content, but as the amount of content grows, this format makes it increasingly difficult for the consumer to locate items of interest.

Furthermore, many of these television providers do not group channels together by type. For example, if a parent is browsing for suitable children's programming, the parent may have to scroll through various pages of information to find the available children's programming channels. This process can be time consuming, and can involve numerous button clicks on the remote. In addition, traditional systems rely on the consumer's ability to remember where each channel is located in the guide, and what type of content each channel provides.

To help alleviate the complexity, some of these on-screen programming guides include the ability to perform a text-based search for programs by title, but such searches are of little use unless the consumer already knows exactly what he or she is looking for.

Hence, what is needed is a method and an apparatus for browsing large collections of media content without the problems listed above.

SUMMARY

One embodiment of the present invention provides a system for browsing a collection of metadata to locate media content associated with an item of metadata. The system operates by receiving a selection of an affinity from a user, wherein the affinity specifies a baseline preference of the user. Next, the system determines a value for each item of metadata in the collection of metadata that specifies how well each item of metadata fits the affinity. Finally, the system arranges the collection of metadata in a view, so that items of metadata with similar values are arranged in close proximity within the view, and so that items of metadata with dissimilar values are not arranged in close proximity within the view.

In a variation on this embodiment, prior to arranging the metadata in the view, the system receives a selection of a second affinity from the user. Next, the system receives a weight for the affinity and a second weight for the second affinity to create a weighted affinity and a weighted second affinity. Finally, the system determines the value for each item of metadata in the collection of metadata that specifies how well each item of metadata fits a combination of the weighted affinity and the weighted second affinity. Note that the present invention is not meant to be limited to the use of one or two gels and one or two affinities. In fact, any number of gels and affinities may be used. In one embodiment of the present invention, the system receives a selection of a third affinity from the user. Next, the system receives a third weight for the third affinity to create a weighted third affinity. Finally, the system determines the value for each item of metadata in the collection of metadata that specifies how well each item of metadata fits a combination of the weighted affinity, the weighted second affinity, and the weighted third affinity.

In a further variation, receiving the selection of the affinity involves receiving the results of a drag and drop operation from the user wherein the user dropped a gel into a selection area, and wherein the gel is a colored translucent object within the view that corresponds to an affinity.

In a further variation, receiving the weight of the affinity involves receiving the results of a resize operation performed by the user, wherein the user resized the gel, and wherein the size of the gel represents the corresponding weight of the affinity.

In a further variation, the system determines the value for each item of metadata in the collection of metadata. Upon receiving an operation on the gel, the system arranges the metadata in the view with no perceptible delay to the user.

In a variation on this embodiment, the system adjusts a zoom factor of the view to show items of metadata with values above a pre-determined threshold.

In a variation on this embodiment, the system applies a fisheye lens to the view, wherein items of metadata that are directly below the fisheye lens are magnified with respect to items that are not directly below the fisheye lens.

In a further variation, the fisheye lens is initially applied to the view in a position directly above items of metadata with the highest values.

In a further variation, the system receives a drag command from the user to drag the fisheye lens across the view. In response to the drag command, the system moves the fisheye lens across the view.

In a further variation the system displays a picture in the fisheye lens, wherein the picture is associated with an item of metadata in the view directly below the fisheye lens.

In a variation on this embodiment, the system stores the value for each item of metadata in the collection of metadata in a persistent storage. Then, the system uses the stored value for each item of metadata in the collection of metadata as a baseline when determining a new value for each item of metadata in the collection of metadata.

In a variation on this embodiment, the affinity can include one of a genre, an era, a score, a visual style, a character, a rating, an award, a previously viewed indicator, a runtime, a recommendation, a foreign designation, an animated designation, a new release designation, and a children's designation.

In a variation on this embodiment, the collection of metadata can be associated with an audio/video media library, a file system, and a directory.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2A illustrates the Media Affinity Browser initialization Sequence in accordance with an embodiment of the present invention.

FIG. 4A presents an outline illustrating aegis considerations in accordance with an embodiment of the present invention.

FIG. 4B presents an outline illustrating properties of the lens object in accordance with an embodiment of the present invention.

FIG. 4C presents an outline illustrating properties of the grid object in accordance with an embodiment of the present invention.

FIG. 4D presents an outline illustrating properties of the toolbar object in accordance with an embodiment of the present invention.

FIG. 4E presents an outline illustrating properties of experience objects in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

Figure 1:
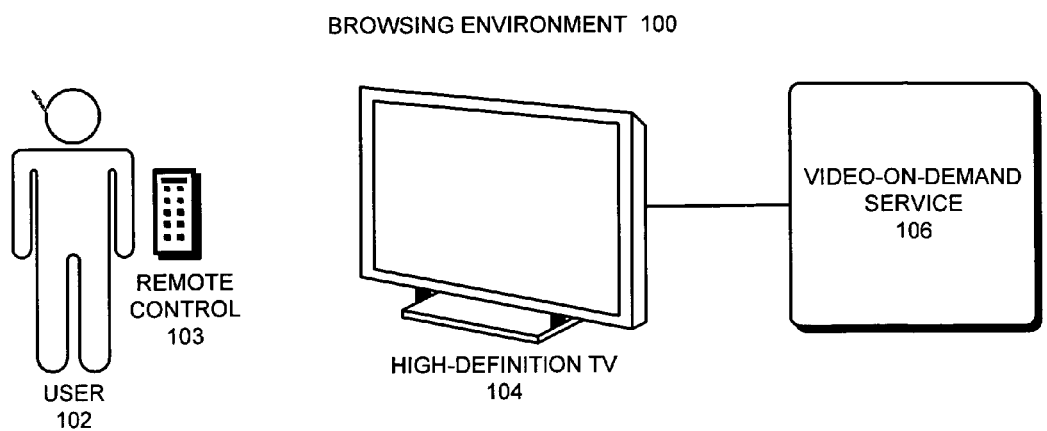
FIG. 1 illustrates a browsing environment in accordance with an embodiment of the present invention.

FIG. 1 illustrates a browsing environment 100 in accordance with an embodiment of the present invention. Browsing environment 100 includes user 102, remote control 103, high-definition television 104, and video-on-demand service 106. Note that high-definition television 104 can include any type of display for viewing media content including, but not limited to, standard television sets, personal computers, notebook computers, Personal Digital Assistants (PDAs), cell phones, and video game consoles.

One embodiment of the present invention provides a system for browsing metadata associated with media content based on a user 102's affinities for media content. The embodiment outlined in the following figures describes the Media Affinity Browser as it would be used in the context of a Video-On-Demand service 106. However, note that the present invention is not meant to be limited to Video-On-Demand service 106, but could apply to browsing metadata associated with any type of content. For example, one embodiment of the present invention provides an affinity browser for searching an audio collection on the user 102's personal computer. In another embodiment of the present invention, an affinity browser is used in place of a standard file explorer to browse through files on the user 102's personal computer.

The Media Affinity Browser's core visual search methodology attempts to bridge the gap between what user 102 'knows' and what 'remains-to-be-seen' by a process of affinitive juxtaposition, or "Visual Affinity Mixing." Visual Affinity Mixing is an externalization of a particularly powerful human cognitive ability (affinity associations) into an elegant, meaningful and useful set of visual affordances for browsing and visually representing relationships, either historical or immediate, among nodes within exponentially massive media databases. Depending on how computing power and sensing evolve in the future, the Visual Affinity Mixing process could even be deployed within physical environments, as an overlay, say in retail, organizational planning, and a myriad of other consumer or enterprise level applications. The embodiment outlined in these figures describes the Media Affinity Browser as it would be used in the context of Video-On-Demand service 106.

Media Affinity Browser Event Sequence

Figure 2B:
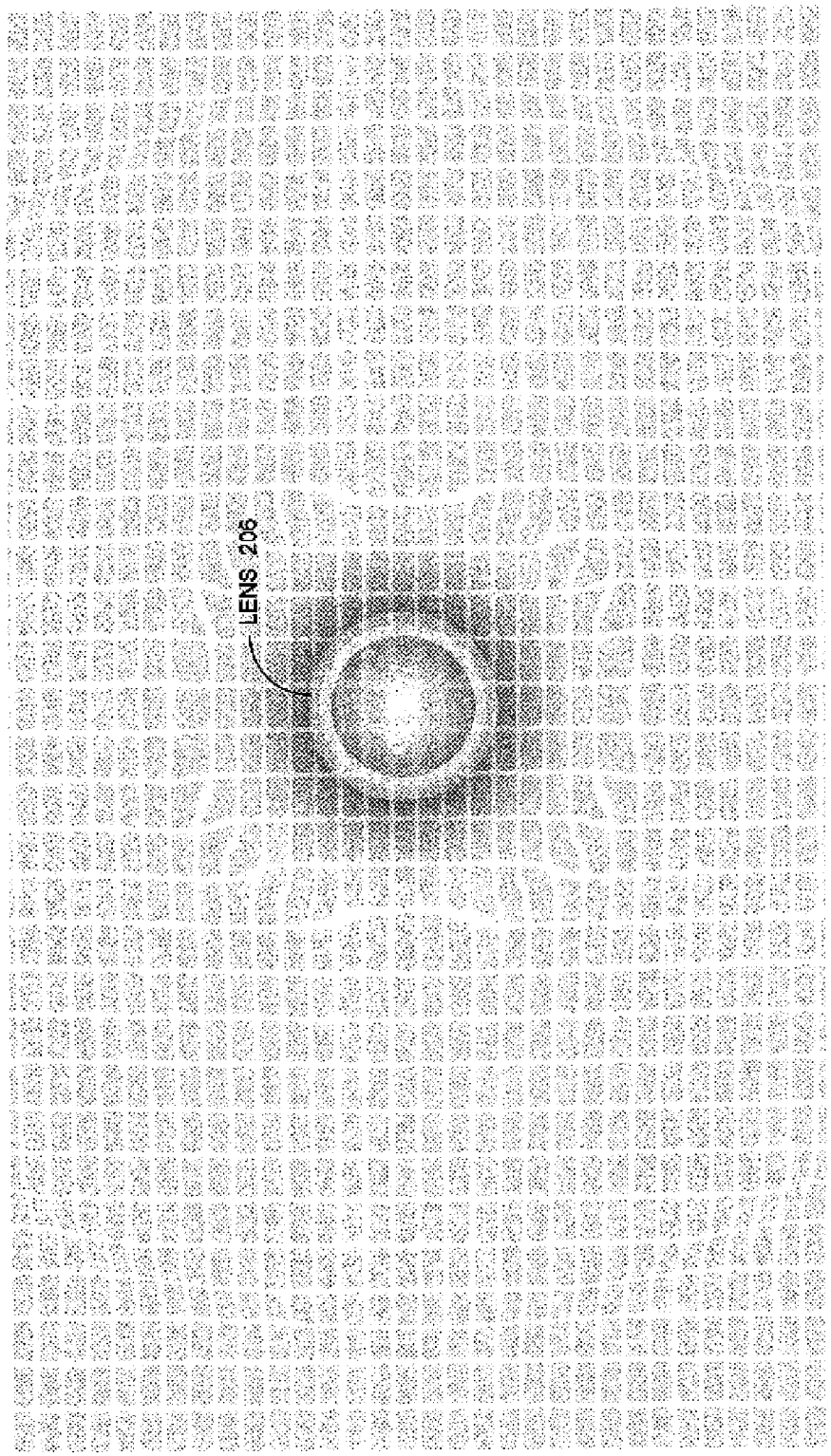
FIG. 2B illustrates Media Affinity Browser branding in accordance with an embodiment of the present invention.

FIG. 2A illustrates the Media Affinity Browser initialization Sequence in accordance with an embodiment of the present invention. The Media Affinity Browser initialization sequence animation expands outward from center screen, revealing the media grid 200 in a pixelated wash. Note that each "block" in the media grid 200, such as blocks 202 and 204, represents an item of content, or in this case, a video available from video-on-demand service 106. Also note that FIGS. 2A to 2K and FIGS. 3A to 3E represent the visual output of the media affinity browser for display on a visual display device, such as high-definition television 104.

FIG. 2B illustrates Media Affinity Browser branding in accordance with an embodiment of the present invention. As the lens object 206 and branding visual artifacts appear within the screen-space, the media grid 200 is seen to ripple outwards from the center. This is meant to be an indication of the power behind, and in, the lens object 206. The media grid 200 initially renders at a "far" depth of field (1024 grid 200 points) and grows and shrinks in size hereafter to indicate the user 102's general relationship to the database or media content. The user 102 relationship to the media grid 200 is never 1:1 except when viewing lens object 206 or Saved Search results, as described below.

Figure 2C:
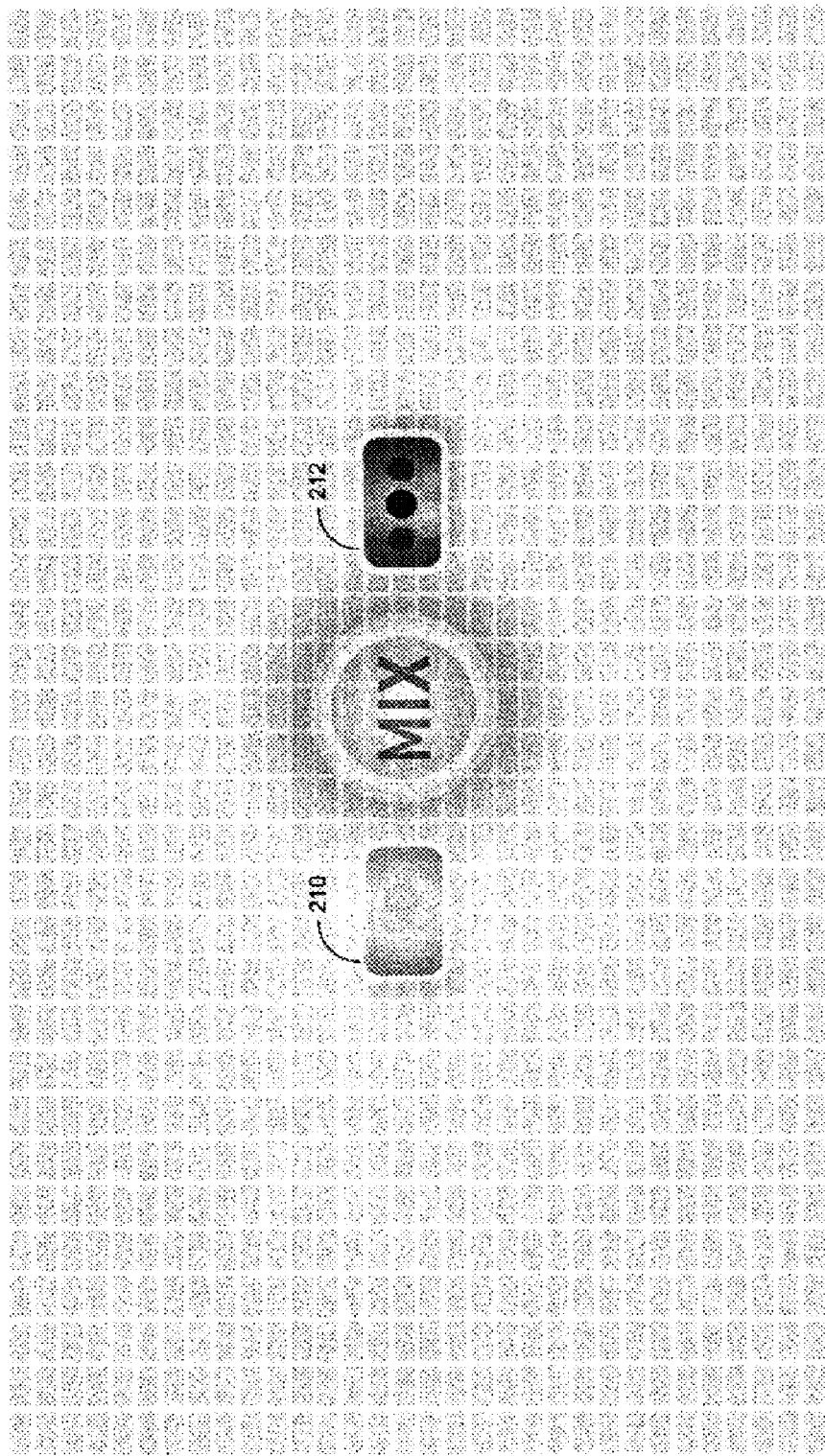
FIG. 2C illustrates Media Affinity Browser with the "MIX" button selected in accordance with an embodiment of the present invention.

In one embodiment of the Media Affinity Browser, two simple buttons appear: "MIX" 210 and "MAP" 212. FIGS. 2C to 2K illustrate "MIX" functionality, while FIGS. 3A to 3E illustrate "MAP" functionality. FIG. 2C illustrates Media Affinity Browser with the "MIX" 210 button selected in accordance with an embodiment of the present invention. Both buttons carry iconic representations of their intended function. Variations on this embodiment feature a Media Affinity Browser Graphical User Interface (GUI) with more feature buttons or control arrays.

Figure 2D:
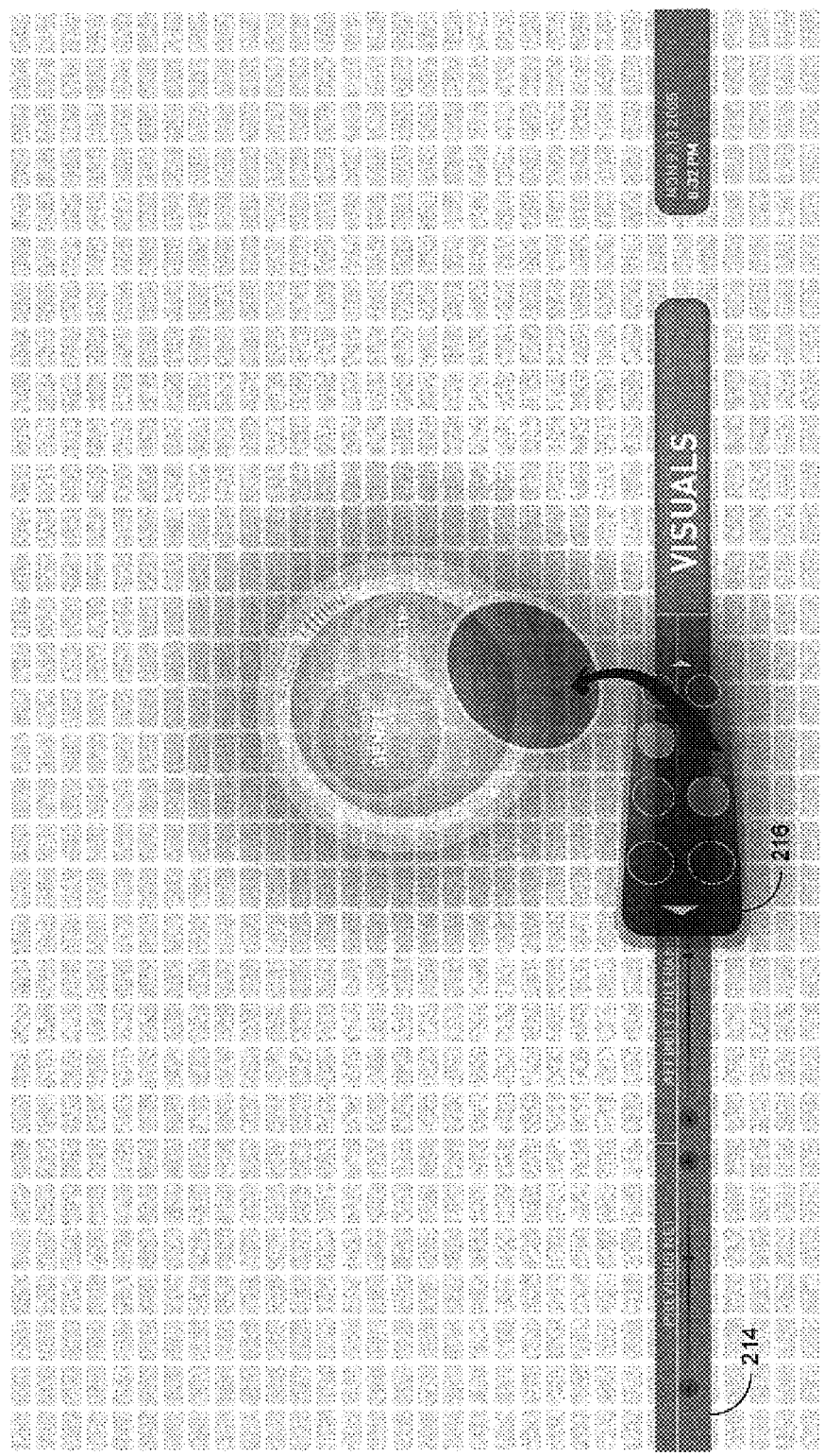
FIG. 2D illustrates an affinity gel palette in accordance with an embodiment of the present invention.

FIG. 2D illustrates an affinity gel palette 216 in accordance with an embodiment of the present invention. Upon selection of the "MIX" feature, the lens object 206 artifact expands in size to allow the process of mixing to begin. In addition to the lens object 206, there is also a toolbar artifact 214 containing control sets. Additionally, the "Focus" feature shown in the lens object 206 ring is meant to suggest that there might be GUI affordances placed there as well (see FIG. 2K). One control set specific to lens object 206 and the mixing function is the "Affinity Gel" palette 216. Via remote device or sensor, such as remote control 103, the user 102 is able to select affinity gels from this affinity gel palette 216 and move them into the lens object 206 wherein they are arranged in an overlapping relationship that can be manipulated further. In one embodiment of the Media Affinity Browser, three gels are shown, but more may be used. The purpose and manipulation of these gels are described below.

Note that the affinity gels can be pre-defined, or in some instances, can be defined by the user 102. In one embodiment of the present invention, the affinity gels are determined by the provider of the media content database, such as video-on-demand service 106.

Figure 2E:
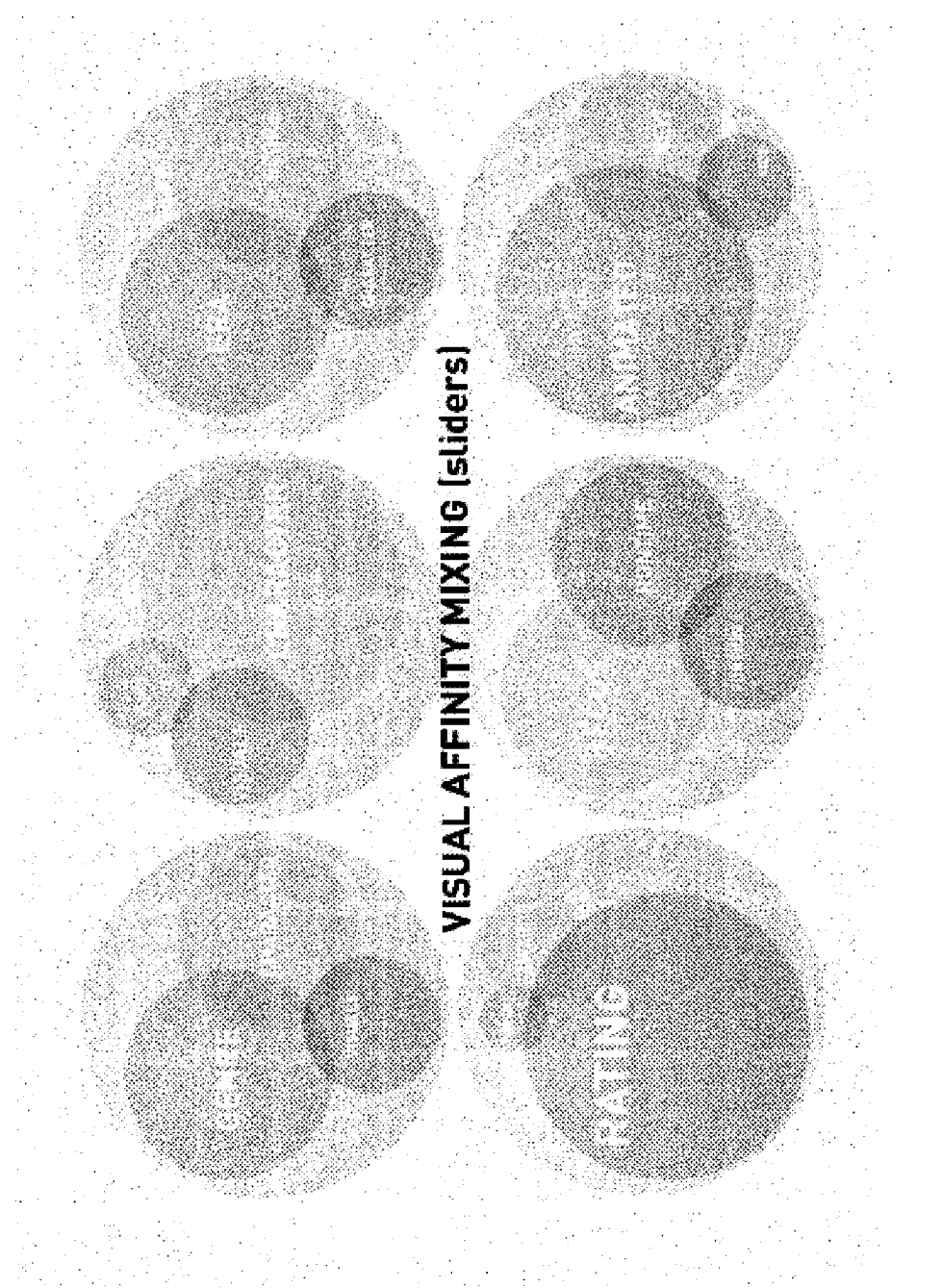
FIG. 2E illustrates various affinity gel arrangements in accordance with an embodiment of the present invention.

FIG. 2E illustrates various affinity gel arrangements in accordance with an embodiment of the present invention. "Affinity" is meant to describe any spontaneous, close relationship a user 102 may feel with any number of metadata search points. An affinity can be further described as a baseline preference of user 102. Depicted here are examples of potential affinities and mix ratios. Visual Affinity Mixing allows a user 102 to "actively maintain control" over a visual representation of the ratio of metadata types being juxtaposed to produce, ideally, a reduced metadata set of higher resolution. The visual mechanism may be thought of as akin to an adjustable Venn Diagram, whose circular bounding elements may be expanded and contracted to yield the desired mix. The affinities are, in essence, metadata categories that have been harnessed in a visual way to effect hierarchical shifts in perspective. FIG. 2K demonstrates that, once the user 102 has attained a certain degree of resolution within the database, this metadata can also become available as a purely indexical affordance.

Figure 2F:
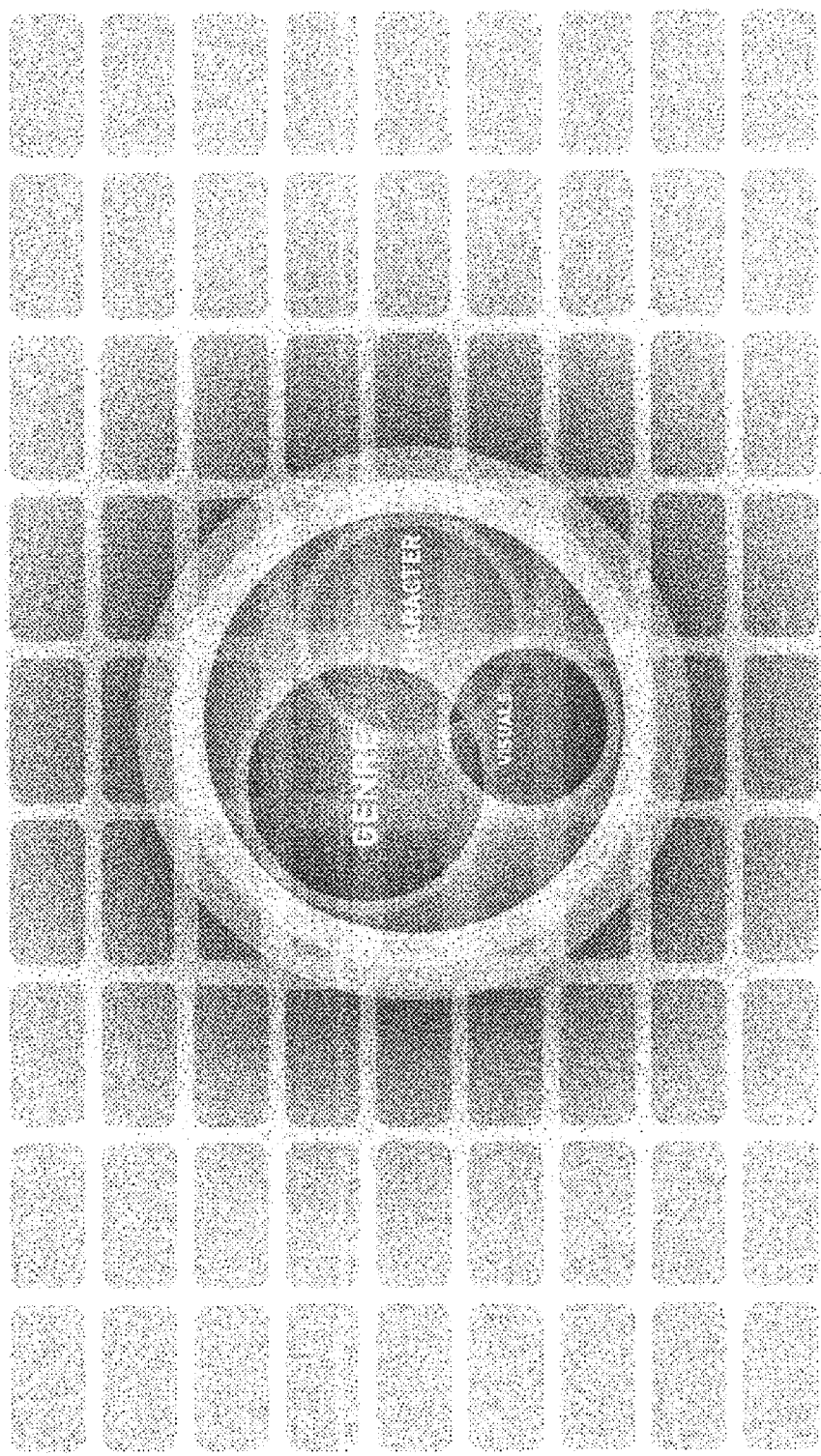
FIG. 2F illustrates a selection of an affinity gel arrangement in accordance with an embodiment of the present invention.

FIG. 2F illustrates a selection of an affinity gel arrangement in accordance with an embodiment of the present invention. After the affinity gels have been selected and adjusted to the desired mix, the media grid 200 expands ("zoom-in") as an indication that a search sequence has begun to resolve.

Figure 2G:
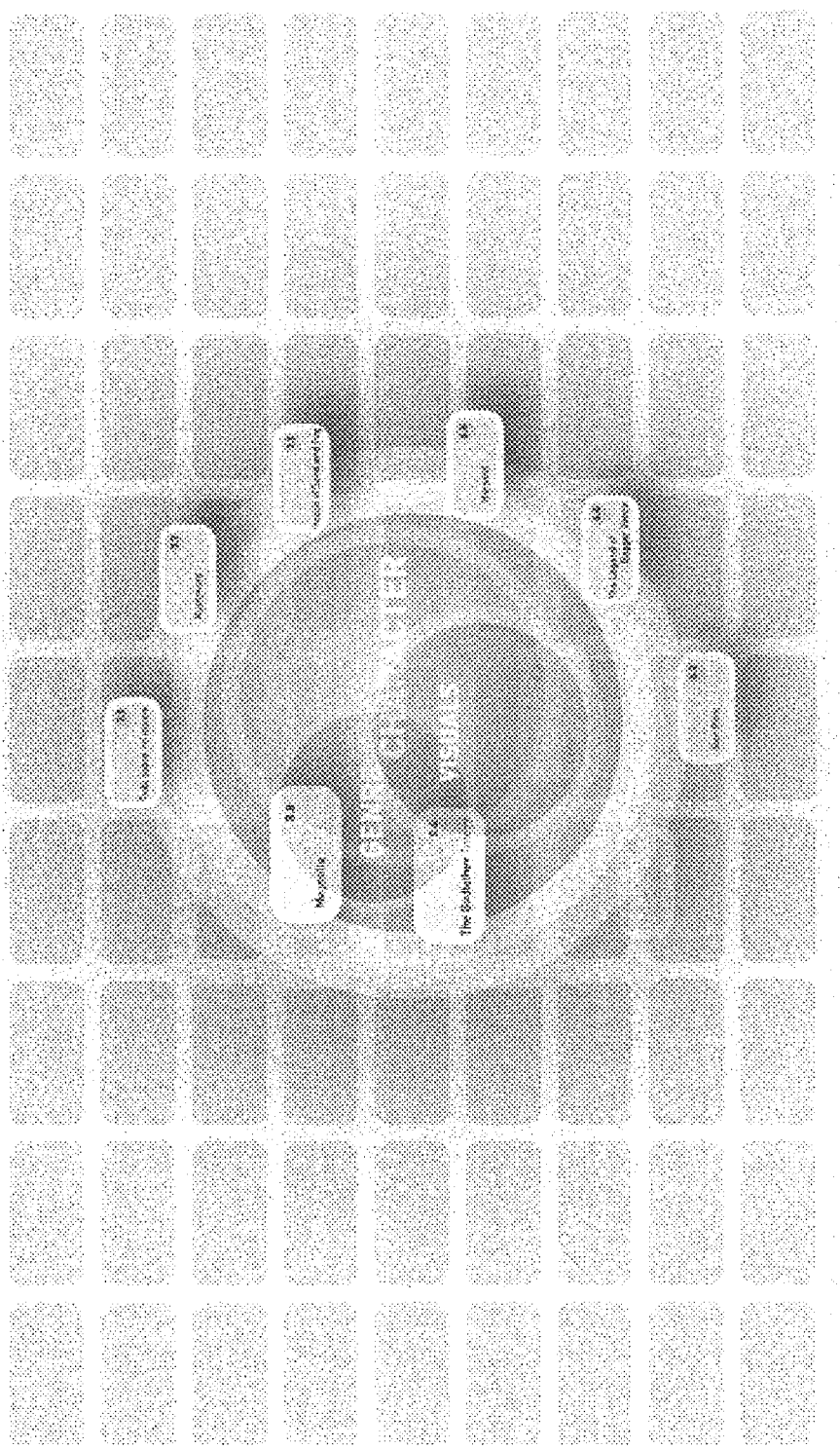
FIG. 2G illustrates continuing refinement of an affinity gel arrangement in accordance with an embodiment of the present invention.

FIG. 2G illustrates continuing refinement of an affinity gel arrangement in accordance with an embodiment of the present invention. The user 102 can continually tweak the affinity mixture in order to yield individual, scored results. In one embodiment of the Media Affinity Browser, the lens object 206 appears as a stationary object but in variations on this embodiment, the lens object 206 allows multi-directional, cursor-like action to explore specific regions of the media grid 200. Movement of lens object 206 can be controlled by remote control 103, or any other input device.

Figure 2H:
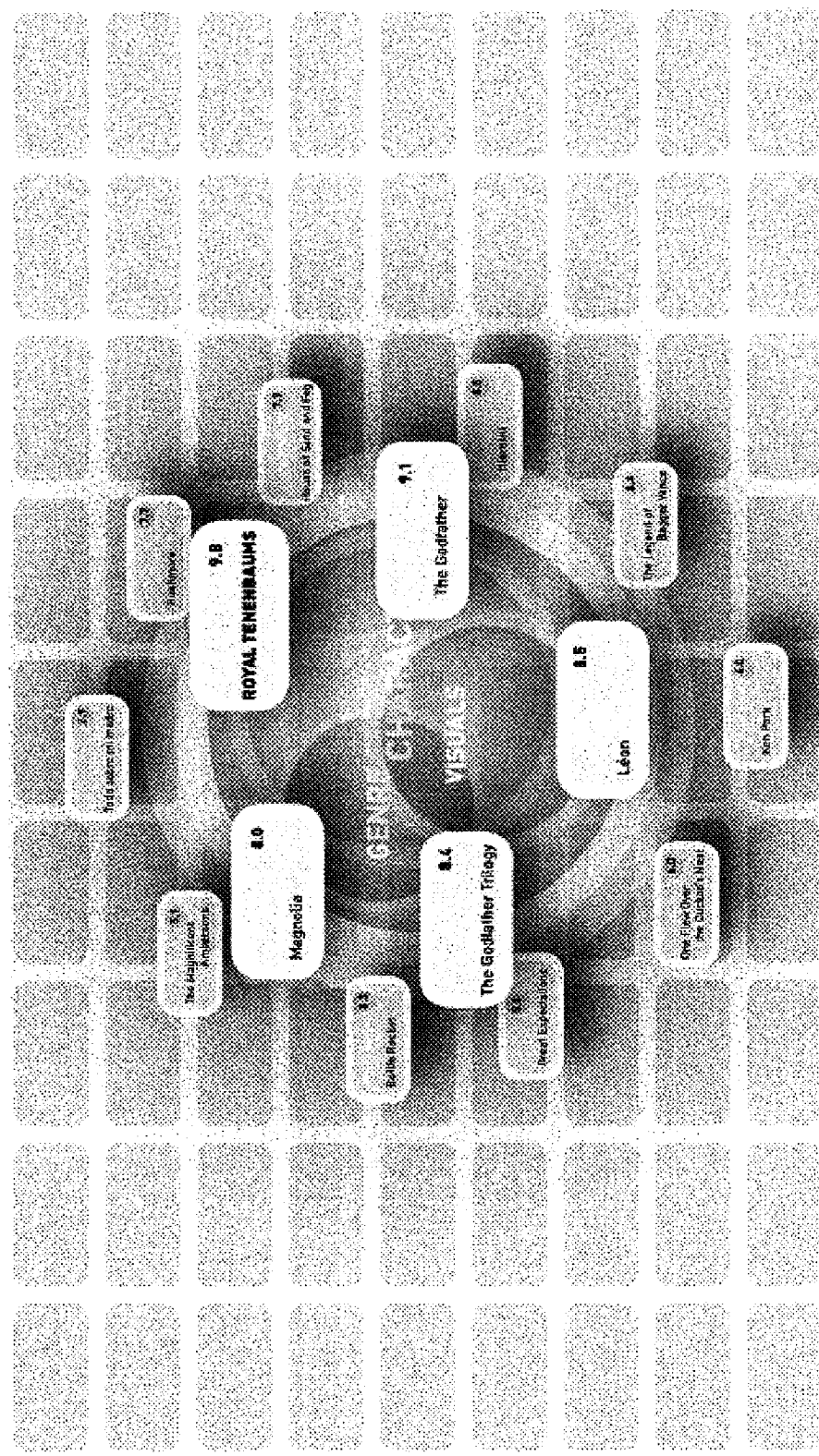
FIG. 2H illustrates search results of the affinity gel arrangement in accordance with an embodiment of the present invention.

FIG. 2H illustrates search results of the affinity gel arrangement in accordance with an embodiment of the present invention. Results are presented in a tiered 'fisheye' around the center and periphery of the lens object 206. Each result is individually scored which determines its place within the tier structure. Affinity Gels can still be tweaked at this point to mildly or radically alter this hierarchy, in real-time.

Figure 2J:
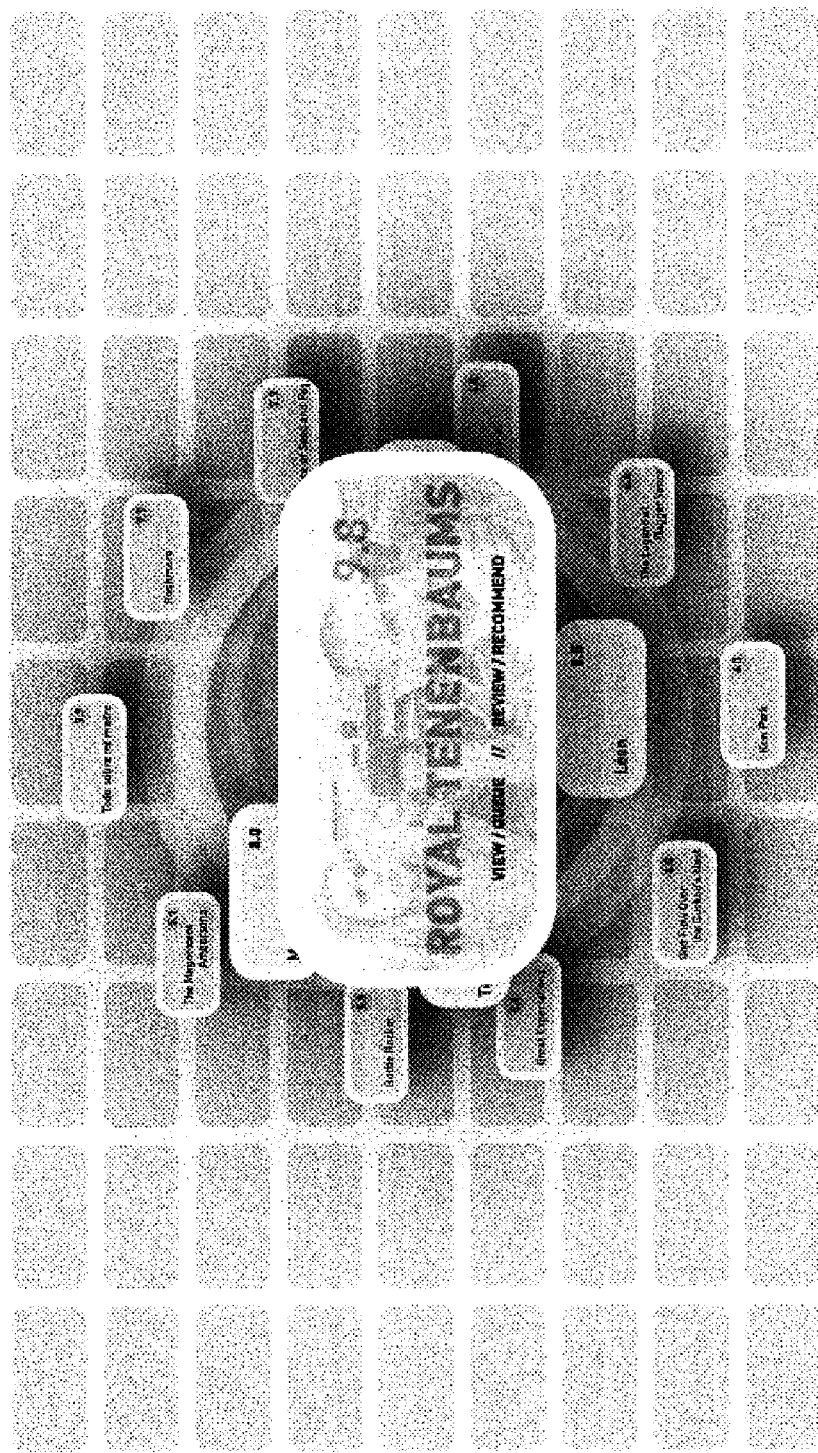
FIG. 2J illustrates selection of a media content item in accordance with an embodiment of the present invention.
Figure 2K:
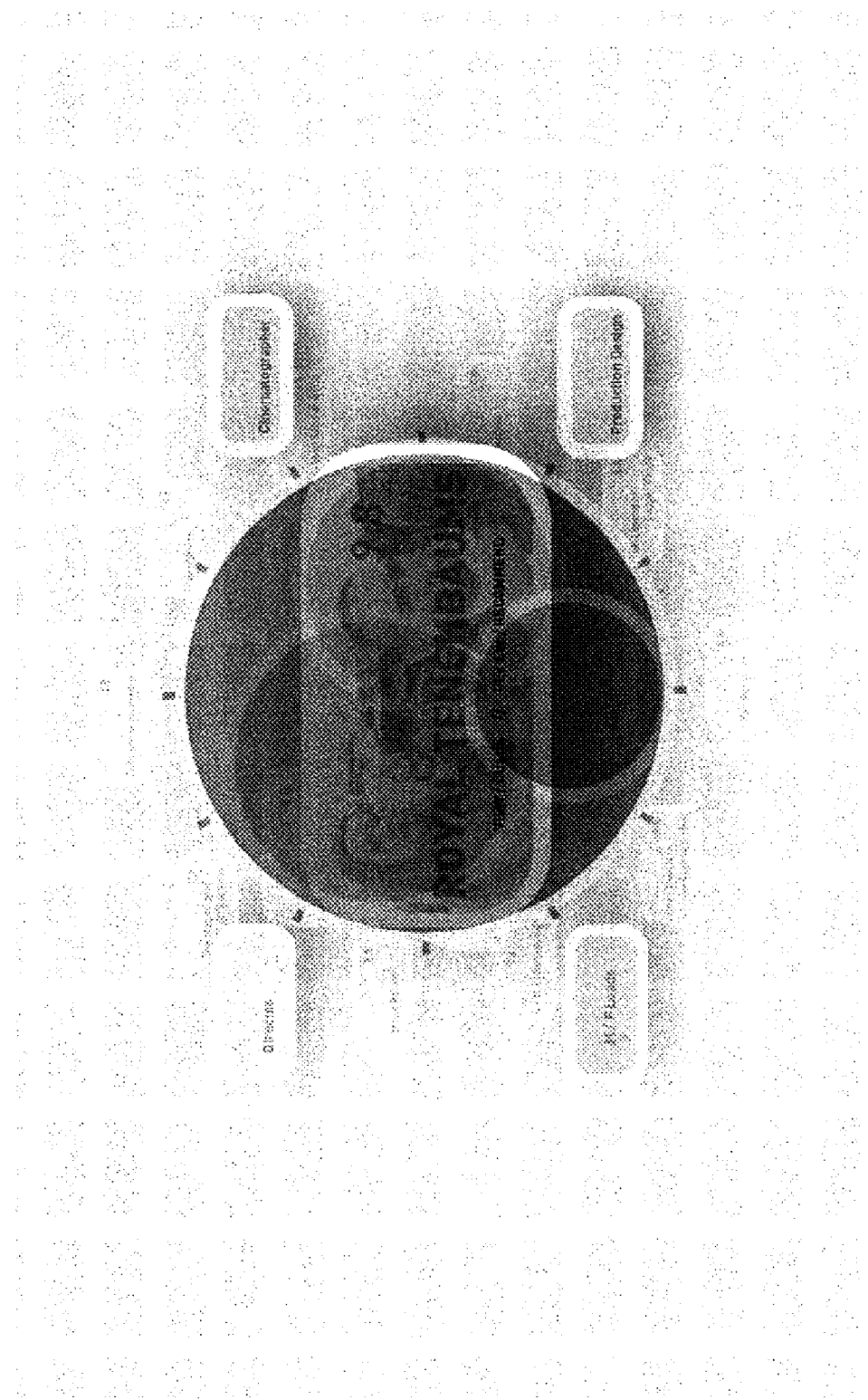
FIG. 2K illustrates viewing metadata associated with the selected media content item in accordance with an embodiment of the present invention.

FIG. 2J illustrates selection of a media content item in accordance with an embodiment of the present invention. When the user 102 makes their selection, the selected media content item is brought to the foreground. In one embodiment of the present invention, standard choices are offered to play the media or perform some other action upon it. A screen detail from the media (a movie, in this case) is also shown as an underlay to the UI.

FIG. 2K illustrates viewing metadata associated with the selected media content item in accordance with an embodiment of the present invention. Should the user 102 wish to engage the selected media file's metadata, another layer of GUI would present itself. This might be achieved by turning the lens object 206 ring (as in the 'Focus' feature mentioned in the description of FIG. 2D) to achieve higher and higher degrees of information resolution for the selected item of media content.

Saved Search Histogram: Mapping Prior Engagements

The Saved Search Histogram feature is presented here in contrast to the functionality of the Visual Affinity Mixing in order to illustrate the idea that the Media Affinity Browser contains within itself key changes of "state" among the omni-present visual artifacts, namely the lens object 206 and the Media grid 200. The lens object 206 is at once a cursor, a loupe, a container, and a presentation platform depending upon the user 102's place in the search sequence. The Media grid 200 is at once a gauge of field resolution and, as the following FIGs. will show, a mapping device. In one embodiment of the present invention, the taxonomic idiom (color, shading, text, etc) used here is present throughout the entire Media Affinity Browser GUI, as it proves useful to the function of the visual affinity mixing.

Figure 3A:
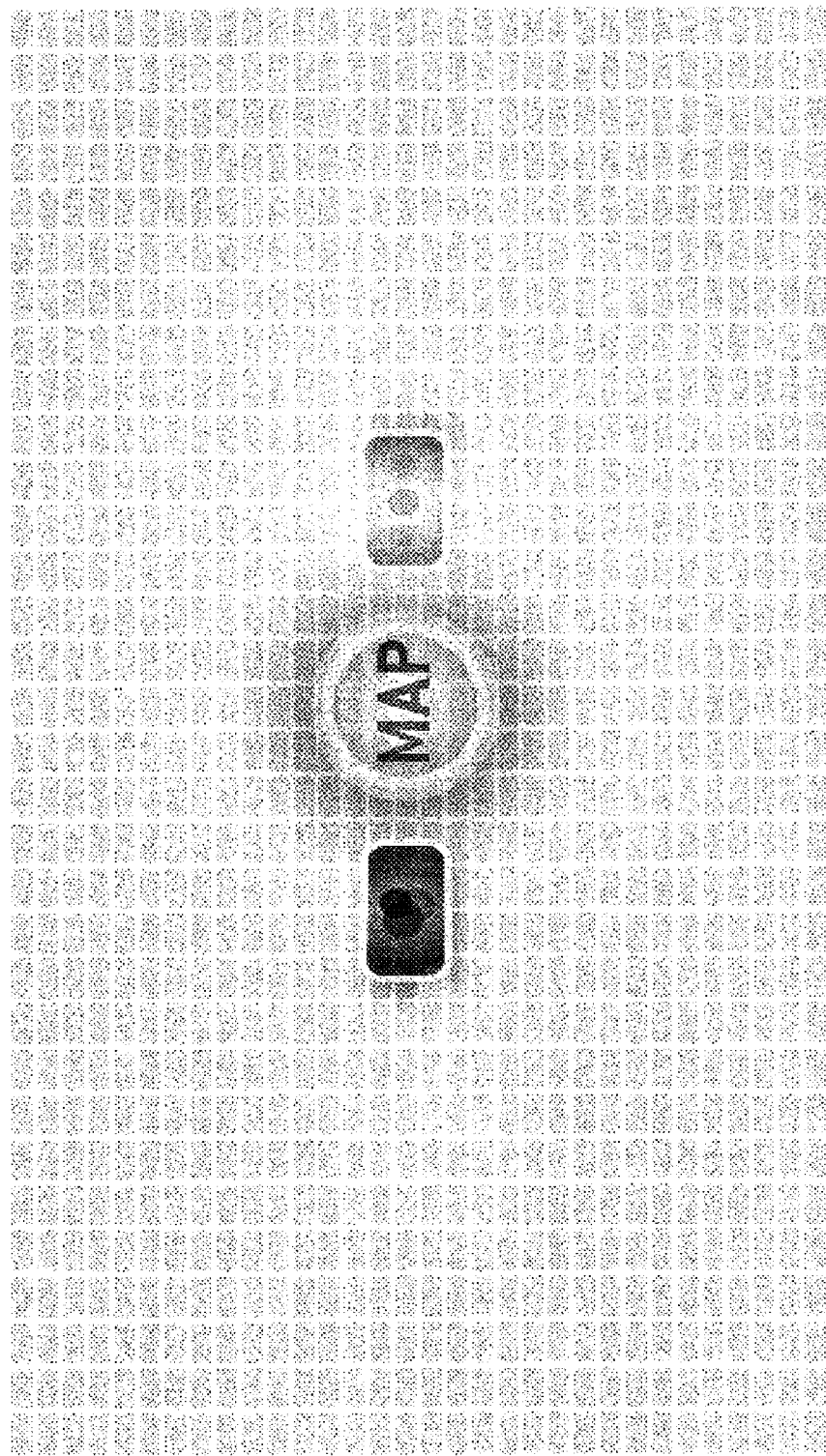
FIG. 3A illustrates Media Affinity Browser with the "MAP" button selected in accordance with an embodiment of the present invention.

FIG. 3A illustrates Media Affinity Browser with the "MAP" button selected in accordance with an embodiment of the present invention. The view illustrated in FIG. 3A is displayed when the user 102 selects the "MAP" feature.

Figure 3B:
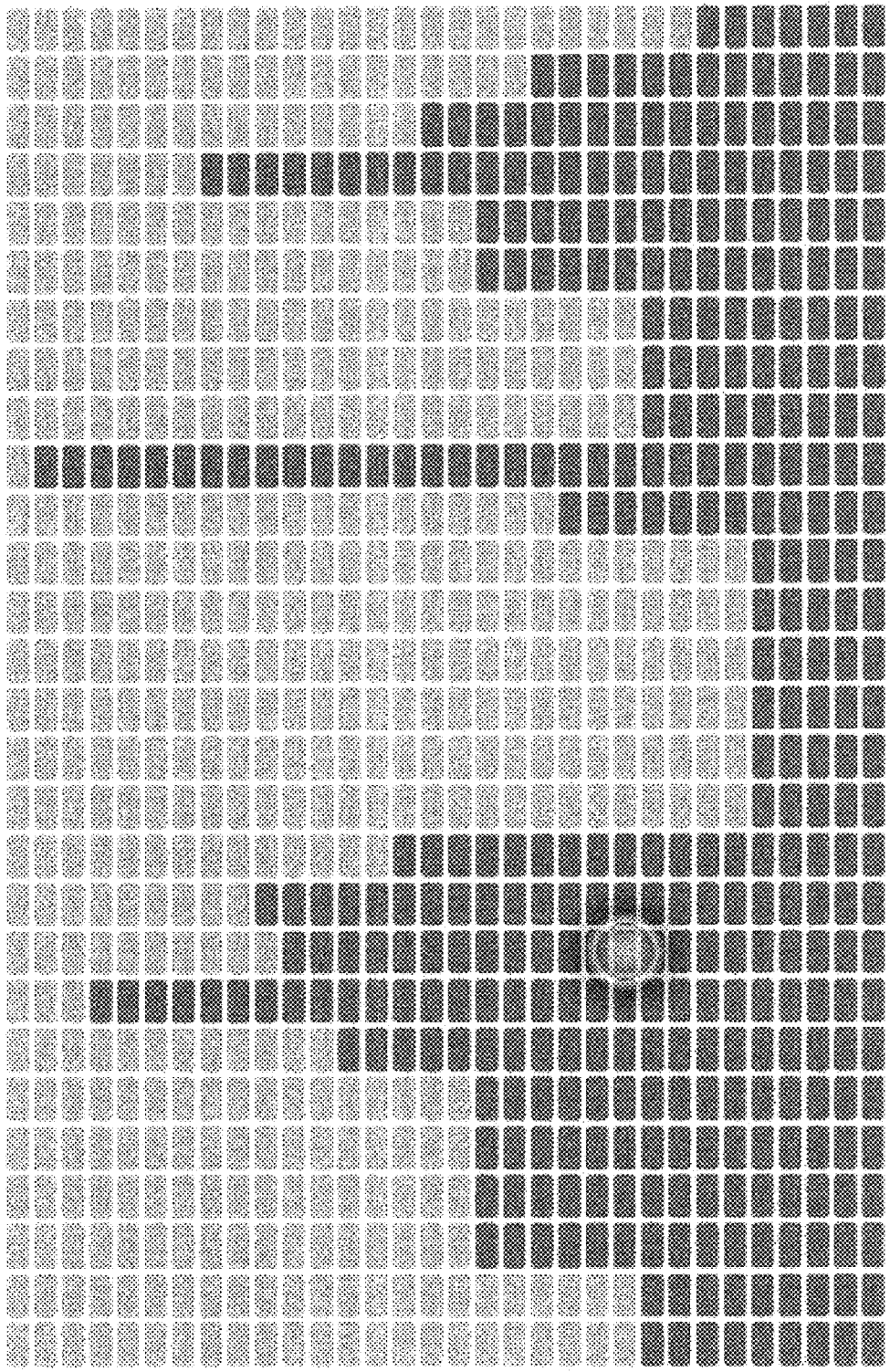
FIG. 3B illustrates a histogram of previous searches in accordance with an embodiment of the present invention.

FIG. 3B illustrates a histogram of previous searches in accordance with an embodiment of the present invention. The Media grid 200 shrinks away from the user 102 ("zoom-out") to indicate a broader perspective on the database of media content. The grid 200 then sub-divides into a representation of previously searched regions. These regions are granted their proportions (height and width) based on user 102 habit: regularity of search in a particular region may be one criteria, success or failure of selection "hits" may be another. The lens object 206 also shrinks to become more like a "cursor that may be moved about freely to explore the shaded regions.

Figure 3C:
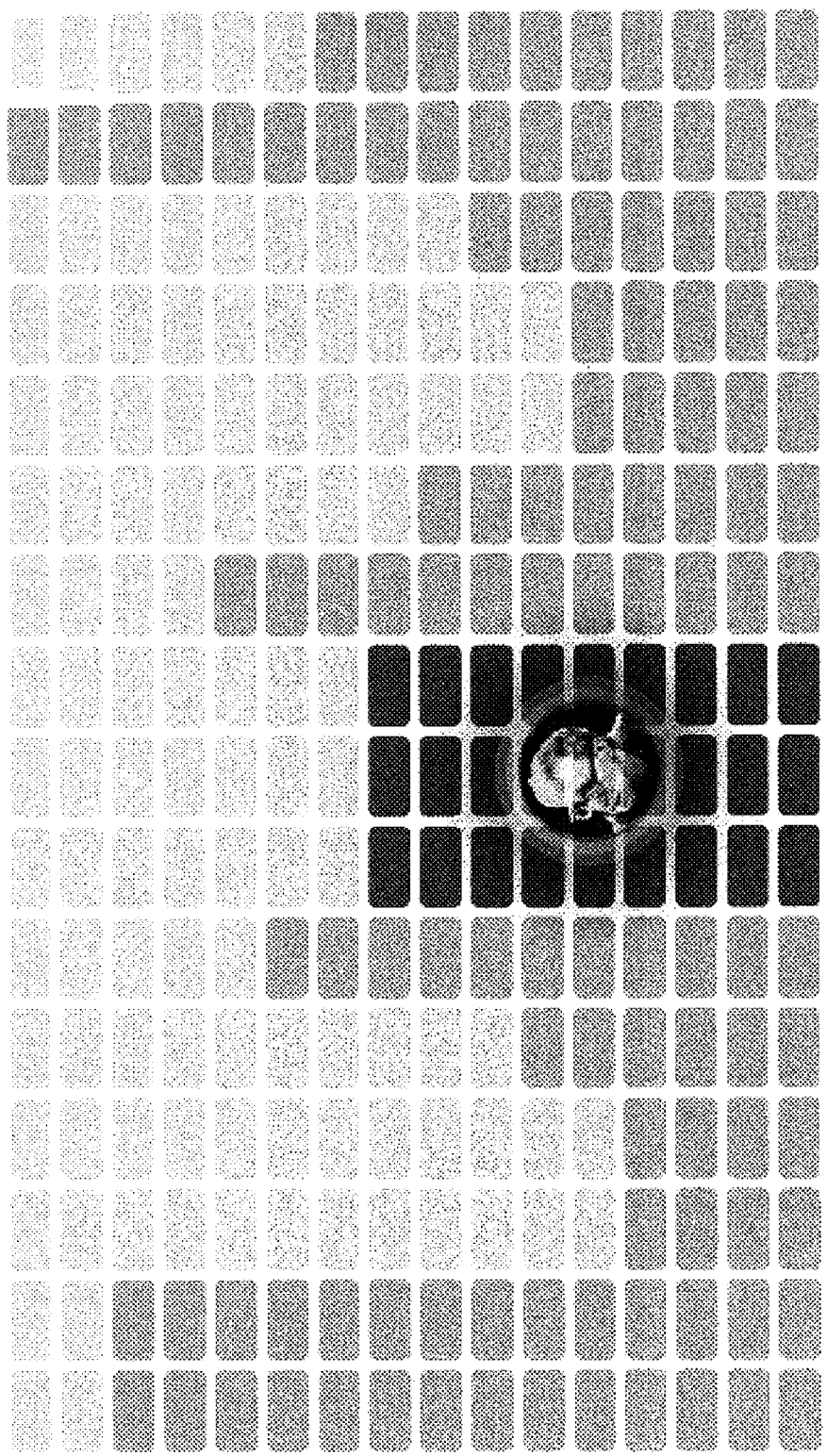
FIG. 3C illustrates an iconic representation of a selected previous search in accordance with an embodiment of the present invention.

FIG. 3C illustrates an iconic representation of a selected previous search in accordance with an embodiment of the present invention. When the user 102 moves the lens object 206 cursor over a particular region grouping, some iconic representation of the search category is displayed.

Figure 3D:
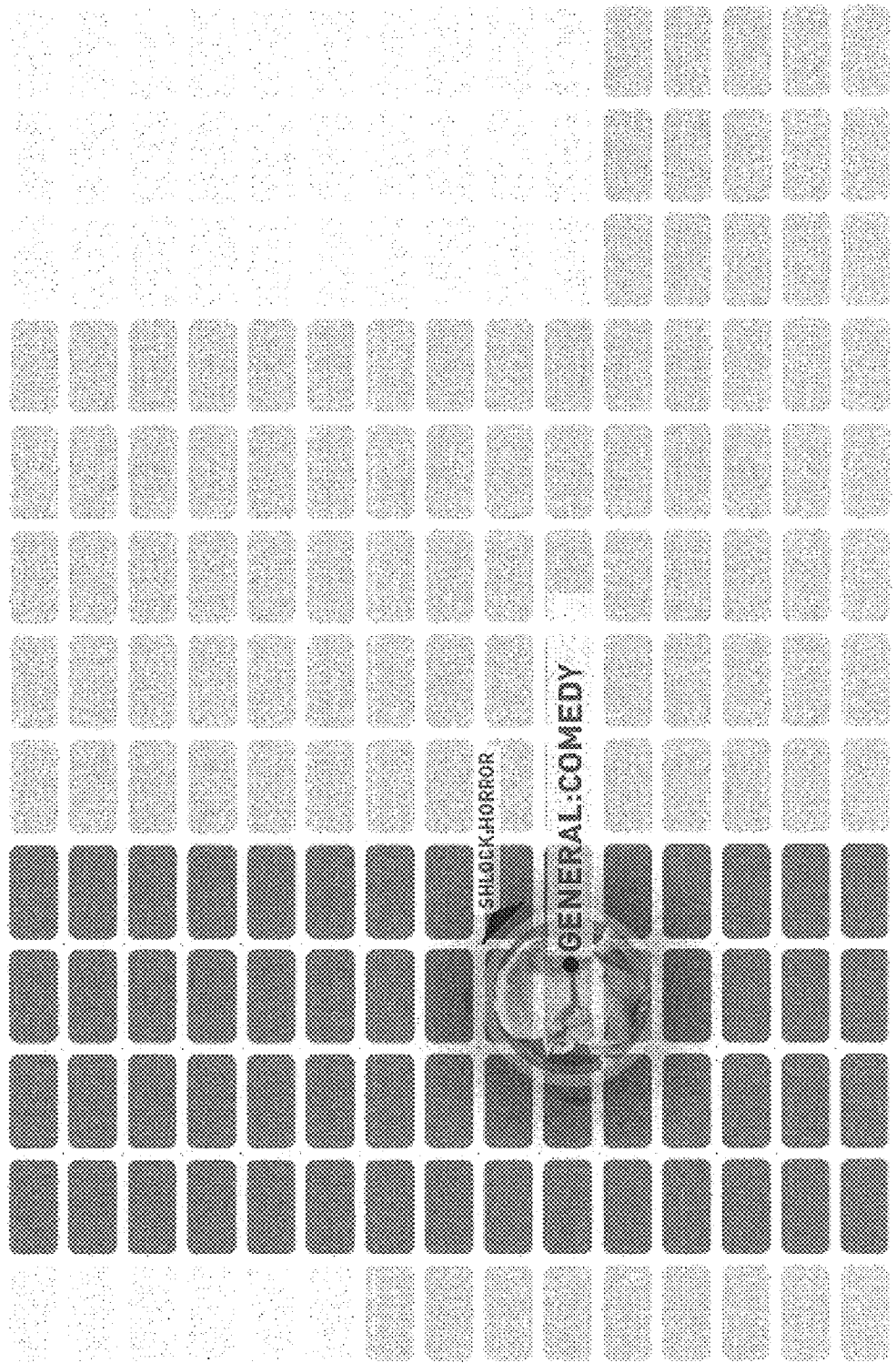
FIG. 3D illustrates additional operations available on a selected previous search in accordance with an embodiment of the present invention.

FIG. 3D illustrates additional operations available on a selected previous search in accordance with an embodiment of the present invention. If the user 102 lingers over a particular region for more than 2 or 3 seconds, the Media grid 200 expands its apparent field of view ("zoom-in") to focus more directly on that grouping. The cursor then exhibits cues for navigating to nearby related regions. Note that the time the user hovers over a region before this additional information is displayed can be adjusted via a global preference. In one embodiment of the present invention, the user manually select the region to view the resulting additional information.

Figure 3E:
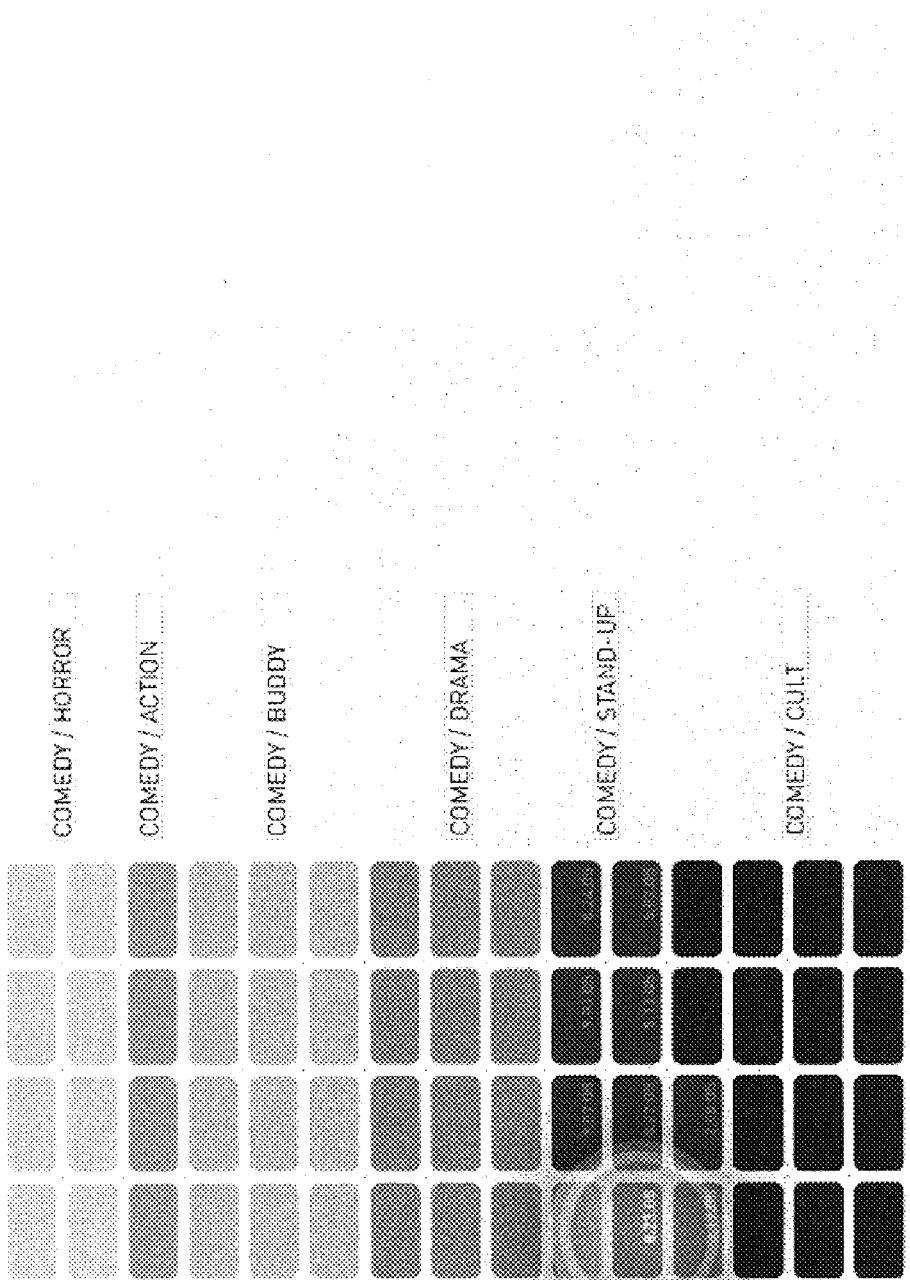
FIG. 3E illustrates a linear view of the selected search in accordance with an embodiment of the present invention.

FIG. 3E illustrates a linear view of the selected search in accordance with an embodiment of the present invention. Finally, the Media grid 200 shifts to a 1:1 color-coded visual representation of the selected region. From here, the user 102 might employ the visual affinity mixing feature of the lens object 206 to refine past results within a discrete node, or simply choose to display a linear listing from which to make their selection.

Aegis Considerations

FIG. 4A presents an outline illustrating aegis considerations in accordance with an embodiment of the present invention. In one embodiment of the present invention, the lens properties should remain constant throughout the browsing process. In addition, the lens properties should remain contextually available so that they can be adjusted at any time by user 102. Furthermore, the lens relationship to the grid changes depending on the browsing context. For example, the lens position on the grid may vary depending on if the user 102 is performing an unstructured search, or if the user 102 is operating on a previously saved search.

Device Objects

FIG. 4B presents an outline illustrating properties of the lens object 206 in accordance with an embodiment of the present invention. In one embodiment of the present invention, the lens object 206 includes an outer ring, an inner ring, affinity gels, a lens material, a results panel, and a selection panel.

The outer ring includes directional arrows that inform user 102 of which way to move the lens object 206 to encounter various results that appear. In addition, the outer ring includes directional label indicators to aid the user 102 in browsing.

The affinity gels can be manipulated by performing a dragging operation on the edges of the affinity gels. In one embodiment of the present invention, placement of the affinity gels is not important. The affinity gels can also include a text label, as well as size relationship to the other affinity gels.

The search panel includes a label that can include both the title of an item of media content, as well as a search hit score for the item of media content.

The selection panel also includes a label that can include both the title of a selected item of media content, as well as a search hit score for the selected item of media content. In addition, the label can include action buttons that aid user 102 in performing various actions, such as view, queue, recommend, and review.

FIG. 4C presents an outline illustrating properties of the grid object in accordance with an embodiment of the present invention. Note that in one embodiment of the present invention, the grid object is only available while the user 102 is in the "histogram" saved-search context described previously.

The grid object includes the following properties: color, contrast/brightness, and labeling. Note that the labeling can be present on both the on-grid panel, as well as floating over a group of similarly associated content.

FIG. 4D presents an outline illustrating properties of the toolbar object in accordance with an embodiment of the present invention. In one embodiment of the present invention, the toolbar is broken up into two pieces. The right-hand side of the toolbar includes information such as the local date and time, as well as remote data, such as the status of video-on-demand service 106. The left-hand side of the toolbar includes information and objects for performing browsing operations. This can include the affinity gel palette 216, including the affinity gel selection tray, and scroll buttons to view more gels, as well as the affinity gel selection tab that includes information about the selected affinity gel.

Experience Objects

FIG. 4E presents an outline illustrating properties of experience objects in accordance with an embodiment of the present invention. Experience objects are objects that describe the use and comprehension of parts of the previously described device objects. In one embodiment of the present invention, experience objects can include the media grid 200, grid effects (including color coding, transitional movements, and transparency), lens effects (including size changes, overlap with the media grid 200, magnification, and minimum and maximum constraint values), toolbar effects (including affinity gel selection and affinity gel placement), and affinity gel effects (including re-sizing and overlap with other affinity gels).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for browsing a collection of metadata to locate media content associated with an item of metadata, wherein the computer includes a processor, the method comprising:

receiving a selection of an affinity from a user,
  wherein the affinity specifies a baseline preference of the user,
  wherein the affinity is represented by a gel, wherein the gel is a colored transparent object within a view that visually represents a weight of a metadata category used to select media content for browsing,
  wherein receiving the selection of the affinity involves receiving the results of a drag and drop operation from the user, and
  wherein the user dropped the gel into a selection area,
receiving a weight of the affinity to create a weighted affinity, wherein receiving the weight of the affinity involves receiving the results of a resize operation performed by the user, wherein the user resized the gel thereby causing a corresponding change in the weight of the affinity, and wherein the size of the gel represents the corresponding weight of the affinity;
determining a value for each item of metadata in the collection of metadata that specifies how well each item of metadata fits the weighted affinity; and
arranging the collection of metadata in a view, so that items of metadata with similar values are arranged in close proximity within the view, and so that items of metadata with dissimilar values are not arranged in close proximity within the view.

2. The method of claim 1, wherein prior to arranging the collection of metadata in the view, the method further comprises:
receiving a selection of a second affinity from the user;
receiving a second weight of the second affinity to create a weighted second affinity; and
wherein determining the value further involves determining the value for each item of metadata in the collection of metadata that specifies how well each item of metadata fits a combination of the weighted affinity and the weighted second affinity.

3. The method of claim 1, further comprising adjusting a zoom factor of the view to show items of metadata with values above a pre-determined threshold.

4. The method of claim 1, further comprising applying a fisheye lens to the view, wherein items of metadata that are directly below the fisheye lens are magnified with respect to items that are not directly below the fisheye lens.

5. The method of claim 1, further comprising:
storing the value for each item of metadata in the collection of metadata in a persistent storage; and
using the stored value for each item of metadata in the collection of metadata as a baseline when determining a new value for each item of metadata in the collection of metadata.

6. The method of claim 1, wherein the affinity includes at least one of:
a genre;
an era;
a score;
a visual style;
a character;
a rating;
an award;
a previously viewed indicator;
a runtime;
a recommendation;
a foreign designation;
an animated designation;
a new release designation; and
a children's designation.

7. The method of claim 1, wherein the collection of metadata is associated with at least one of:
an audio/video media library;
a file system; and
a directory.

8. An apparatus configured for browsing a collection of metadata to locate media content associated with an item of metadata, comprising:
a visual display device;
a receiving mechanism configured to receive a selection of an affinity from a user,
wherein the affinity is represented by a gel wherein the gel is a colored transparent object within a view that visually represents a weight of a metadata category used to select media content for browsing,
wherein the affinity specifies a baseline preference of the user,
wherein receiving the selection of the affinity involves receiving the results of a drag and drop operation from the user,
wherein the user dropped the gel into a selection area,
wherein the receiving mechanism is further configured to receive a weight of the affinity to create a weighted affinity,
wherein receiving the weight of the affinity involves receiving the results of a resize operation performed by the user,
wherein the user resized the gel thereby causing a corresponding change in the weight of the affinity, and
wherein the size of the gel represents the corresponding weight of the affinity;
a determination mechanism configured to determine a value for each item of metadata in the collection of metadata that specifies how well each item of metadata fits the weighted affinity; and
a presentation mechanism configured to arrange the collection of metadata in a view on the visual display device, so that items of metadata with similar values are arranged in close proximity within the view, and so that items of metadata with dissimilar values are not arranged in close proximity within the view.

9. The apparatus of claim 8:
wherein the receiving mechanism is further configured to receive a selection of a second affinity from the user;
wherein the receiving mechanism is further configured to receive a second weight of the second affinity to create a weighted second affinity; and
wherein the determination mechanism is further configured to determine the value for each item of metadata in the collection of metadata that specifies how well each item of metadata fits a combination of the weighted affinity and the weighted second affinity.

10. The apparatus of claim 8, further comprising a zoom mechanism configured to adjust a zoom factor of the view to show items of metadata with values above a pre-determined threshold.

11. The apparatus of claim 8, further comprising a lens mechanism configured to apply a fisheye lens to the view, wherein items of metadata that are directly below the fisheye lens are magnified with respect to items that are not directly below the fisheye lens.

12. The apparatus of claim 8, further comprising:
a storage mechanism configured to store the value for each item of metadata in the collection of metadata in a persistent storage; and
a usage mechanism configured to use the stored value for each item of metadata in the collection of metadata as a baseline when determining a new value for each item of metadata in the collection of metadata.

13. The apparatus of claim 8, wherein the collection of metadata is associated with at least one of:
an audio/video media library;
a file system; and
a directory.

14. A computer-readable storage medium storing instructions that when executed by a computer cause the computer to perform a method for browsing a collection of metadata to locate media content associated with an item of metadata, the method comprising:
receiving a selection of an affinity from a user, wherein the affinity specifies a baseline preference of the user,
wherein receiving the selection of the affinity involves receiving the results of a drag and drop operation from the user,
wherein the affinity is represented by a gel, wherein the gel is a colored transparent object within a view that visually represents a weight of a metadata category used to select media content for browsing, wherein the user dropped the gel into a selection area, and wherein the gel is a colored translucent object within the view that corresponds to an affinity, receiving a weight of the affinity to create a weighted affinity, wherein receiving the weight of the affinity involves receiving the results of a resize operation performed by the user, wherein the user resized the gel thereby causing a corresponding change in the weight of the affinity, and wherein the size of the gel represents the corresponding weight of the affinity;

determining a value for each item of metadata in the collection of metadata that specifies how well each item of metadata fits the weighted affinity; and arranging the collection of metadata in a view, so that items of metadata with similar values are arranged in close proximity within the view, and so that items of metadata with dissimilar values are not arranged in close proximity within the view.

15. The computer-readable storage medium of claim 14, wherein prior to arranging the collection of metadata in the view, the method further comprises:

receiving a selection of a second affinity from the user;

receiving a second weight of the second affinity to create a weighted second affinity; and wherein determining the value further involves determining the value for each item of metadata in the collection of metadata that specifies how well each item of metadata fits a combination of the weighted affinity and the weighted second affinity.

* * * * *